July 28, 1959  J. PERDUE  2,896,884
RETRACTABLE AIRCRAFT LANDING GEAR
Filed July 6, 1954  10 Sheets-Sheet 2

FIG.2.

Inventor:
Jack Perdue
By his attorneys:
Baldwin & Wight

FIG.3.

July 28, 1959     J. PERDUE     2,896,884
RETRACTABLE AIRCRAFT LANDING GEAR
Filed July 6, 1954     10 Sheets-Sheet 4

Fig.4.

Inventor:
Jack Perdue
By his attorneys:
Baldwin & Wight

FIG.5.

July 28, 1959 — J. PERDUE — 2,896,884
RETRACTABLE AIRCRAFT LANDING GEAR
Filed July 6, 1954 — 10 Sheets-Sheet 10

Fig. 9.

Inventor:
Jack Perdue
By his attorneys:
Baldwin & Wight

2,896,884

RETRACTABLE AIRCRAFT LANDING GEAR

Jack Perdue, Great Sankey, Warrington, England, assignor to Electro-Hydraulics Limited, Warrington, England, a company of Great Britain Application July 6, 1954, Serial No. 441,453

8 Claims. (Cl. 244—102)

This invention relates to retractable landing gear construction for aircraft, and deals with the type of landing gear in which wheels or tracks are mounted in tandem or on an undercarriage support beam or bogie frame, of fixed or articulated construction. When dealing with retractable landing gear of this type difficulty is encountered in finding adequate storage space for the landing gear in the retracted position and it is the main object of this invention to overcome this difficulty.

According to this invention, in a retractable landing gear construction for aircraft, the undercarriage supports carrying the ground contacting elements are articulated in respect to the undercarriage linkage structure, and are provided with members such as rollers which, on retraction of the landing gear, will co-operate with means on the aircraft or the undercarriage linkage so as to alter automatically the articulated relationship of the undercarriage support means to the undercarriage linkage structure and facilitate the storage of the landing gear in its aircraft compartment.

The rollers are preferably mounted on a bogie frame, which carries the wheels, and in one arrangement the rollers are adapted to co-operate with cams and in an alternative arrangement with hook means.

One embodiment of this invention is illustrated in the accompanying drawings in which.

Referring to the said drawings, the undercarriage linkage structure (see more particularly Figure 3) comprises a resilient telescopic undercarriage leg structure 1 containing a sliding tube 2, the leg structure terminating in pins 22 adapted to be held in the stops 23 (Figures 2 and 4) of the aircraft when the landing gear is lowered. The leg structure 1 is provided with a lug 3 (Figures 1 and 2) to which is pivotally connected at 5 one end of a rigid bracing member 4, the other end of which is pivotally connected at 6 to the aircraft frame F. Pivotally mounted on the same pivot 6 to the aircraft is a piston rod 24 of a retraction jack 25 with a slot 54 for lost motion (Figures 4a and 5), the other end of the jack being pivoted to the centre pivot point 26 of two arms, one 27 of which is pivotally connected at 28 to the aircraft, and the other 29 of which is pivoted at 30 to the rigid bracing member 4. On the pivot 30 is also pivoted an arm 32 integral with or carrying a latch 31, the arm 32 being pivoted to a link 33 which in turn is pivotally connected to a lever 34, which pivots on a pin 35 (Figure 4) fixed to the rigid bracing member 4, the parts being urged to the left by a spring 55 fixed at one end to the lever 32 and at the other end to the rigid bracing member 4. The lever 34 terminates in a projection 36 which rests on a pin 37 carried by the piston rod 24 of the retraction jack 25. The latch 31 is adapted to engage a pin 38 (Figure 5) fixed to a bogie frame or undercarriage support 52, which carries the ground contacting members or wheels, thus providing an uplock when the landing gear is retracted.

The pins 22 at the upper end of the leg structure 1 are each connected to guide bars, one of which is shown at 39, pivotally attached at 40 to the aircraft, the said guide bars forming the point of pivotal attachment of the undercarriage to the aircraft for retraction. Mounted on each pin 22 is a latch lever 41 adapted to engage pin 42 (Figures 2 and 4) on the aircraft, so as to provide a down lock for the lowered position.

Pivotally attached at 43 (Figure 4) to the aircraft is one end of a subsidiary jack 44, the other end of which has a lost motion connection to the guide bars 39, for example through radial slots 45 in lugs 46 carried by the said bars. The subsidiary jack 44 has connected thereto a link 47 which is pivotally attached at its other end to the down lock latch 41.

Hinged at one end to a bracket 50 of the undercarriage leg is an additional telescopic unit 64 containing the cylinder 56 of an auxiliary shock absorber adapted to pitch the beam 52, in such a way that a set of wheels, the rear ones in the direction of flight, will touch ground before the others and will be prerotated so as to reduce the drag load on the undercarriage leg. When the aircraft is airborne, the piston rod 57 (Figure 2) of the auxiliary shock absorber 56 will be extended due to the action of its spring. When beam 52 is parallel with the ground, the auxiliary shock absorber 56 will be partly closed, its action being explained in U.S. Patent No. 2,670,160 and U.S. Patent No. 2,732,152.

Means is provided for guiding and positioning the undercarriage support 52 and the undercarriage linkage into nested retracted relation and includes a first member comprising cam followers or rollers 59 and 61 mounted for free rotation and for movement with the support 52 on pins 58 and 60, respectively, secured to the beam 52. A second member of the positioning means comprises a cam having two tracks 62 and 63 mounted on the bracing member 4 of the undercarriage linkage in the path of movement of the undercarriage support 52 so as to be engaged by the first member during the last portion of retracting movement of the undercarriage parts.

Figures 1, 1A:
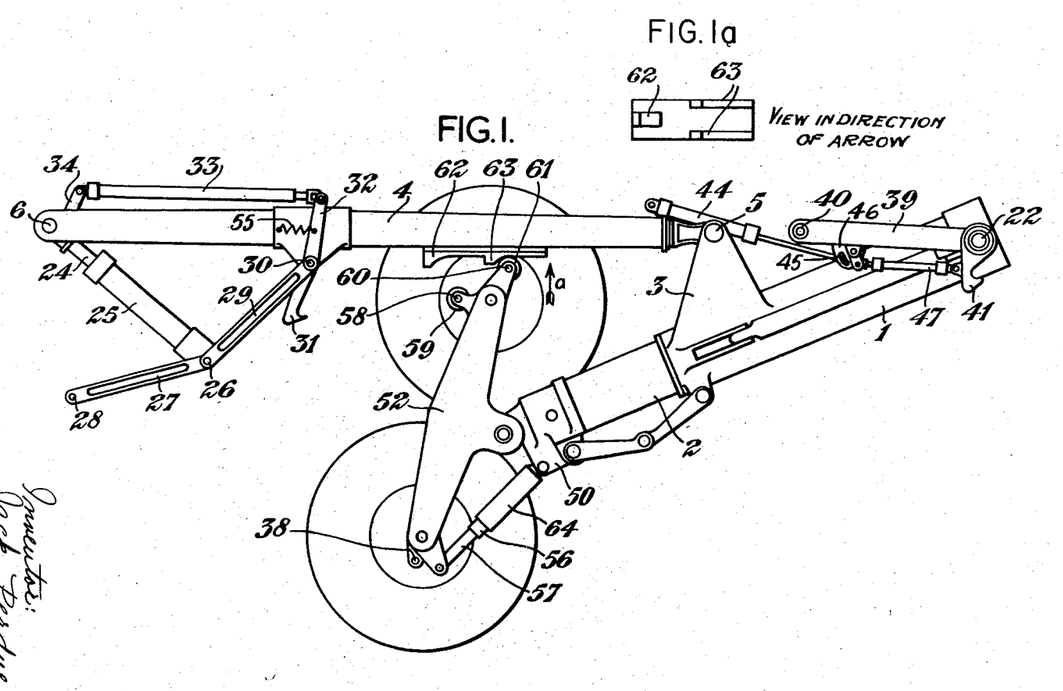
Figures 1 and 2 are side elevations with the landing gear partially retracted and wholly retracted respectively.
Figure 1a is a detail plan view of a cam member as seen when looking in the direction of the arrow a in Figure 1.

When it is desired to retract the undercarriage, the pilot selects for operation, in known manner, the main retraction jack 25 and the down lock subsidiary jack 44. During the first part of the extension of the down lock subsidiary jack 44, due to its lost motion, said jack moves in the slot 45, causing the link 47 to move the latch 41 in a clockwise direction off the pin 42 and break the downlock. Further extension of the subsidiary jack moves the guide bars 39 so as to bring the said guide bars into prolongation with the undercarriage leg structure 1 and sliding tube 2; further extension of said subsidiary jack acts to assist the main retraction jack 25 to complete retraction of the landing gear by rocking the guide bars 39 about their pivots 40 so as to jackknife the guide bars and leg structure 1 and move the upper end of the leg structure upwardly and rearwardly as shown in Figure 1, whilst, during this movement, the bracing member 4 is held so that the pin 6 is in the outer end of the slot 54 in the piston rod 24, and the uplock latch 31 is urged in an anti-clockwise direction by the spring 55.

Figure 2:
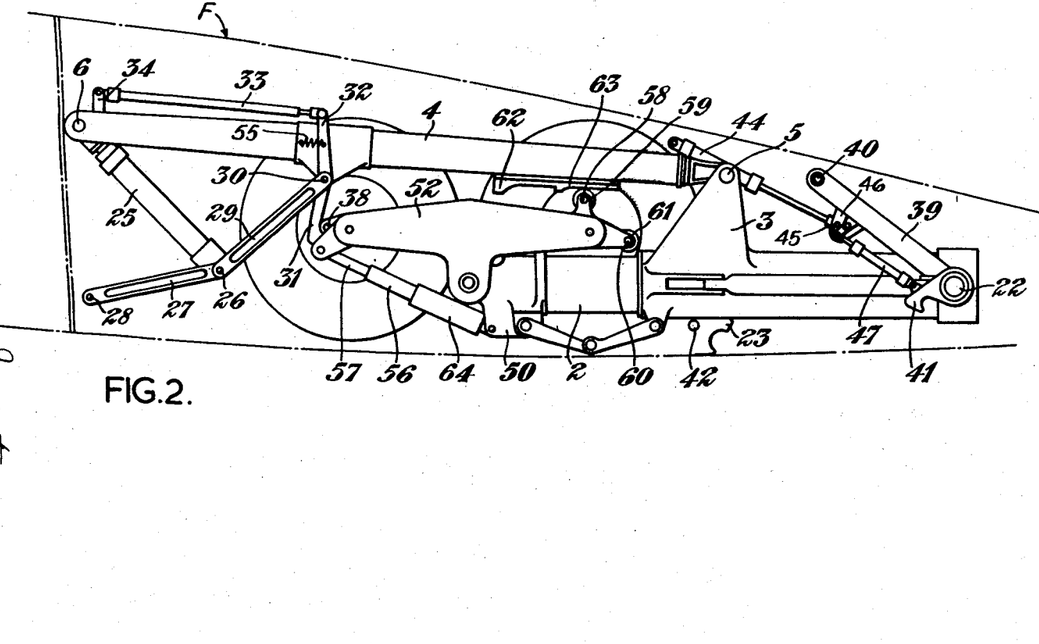
Figure 3:
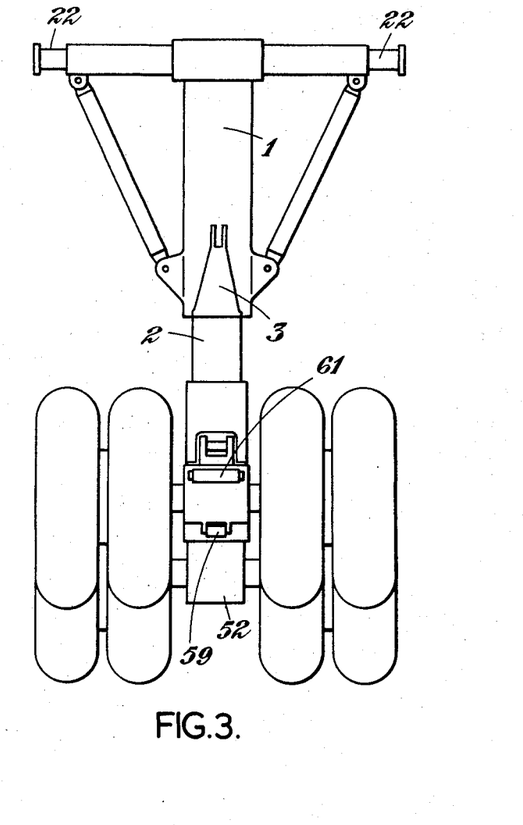
Figure 3 is a front elevation with the landing gear lowered, and Figure 4 a side elevation thereof, Figures 4a and 5 being detail views. An alternative arrangement is shown in Figures 6 and 7 in which the landing gear is shown in the normal or lowered position with the wheels supporting the aircraft weight.
Figure 4:
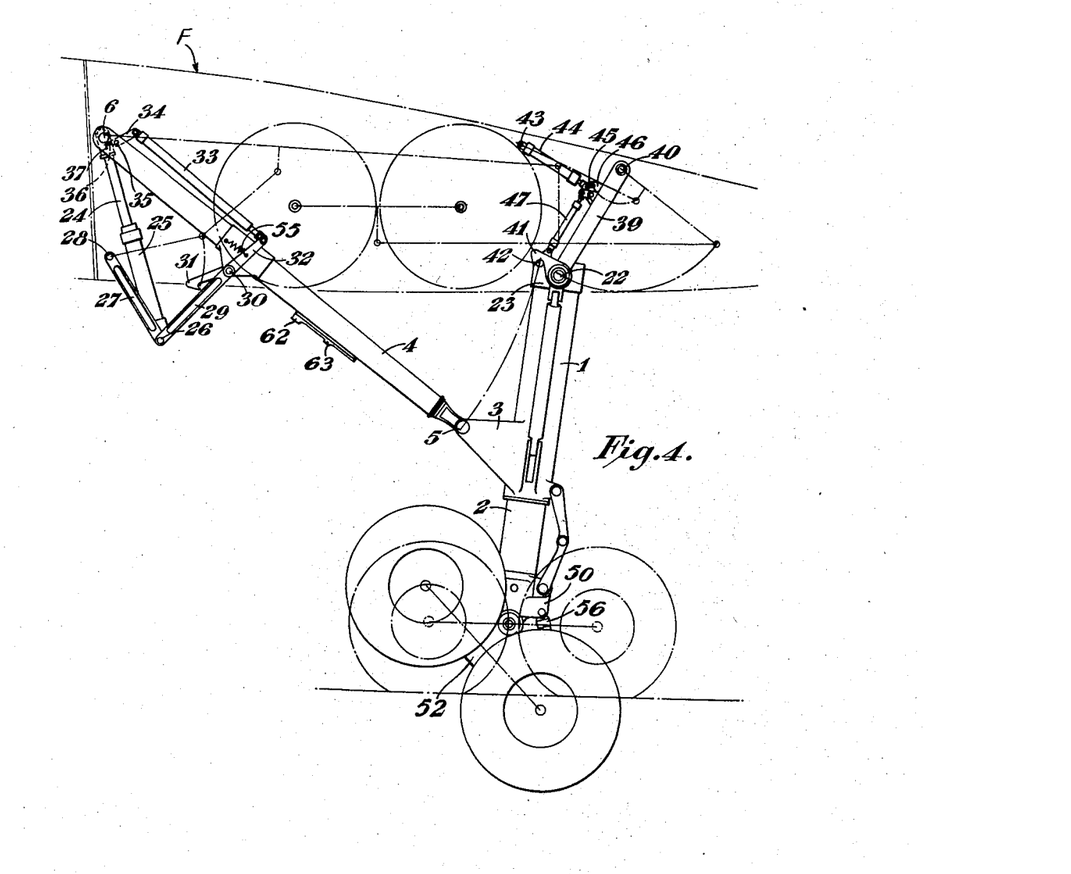
Figure 4A:
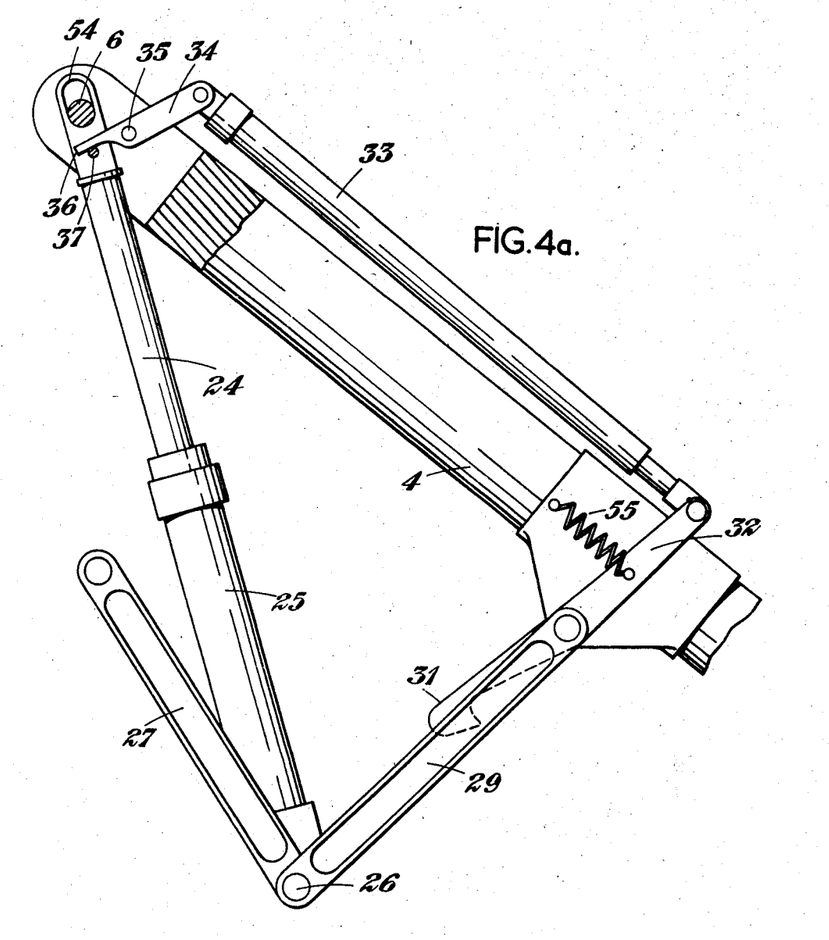
Figure 5:
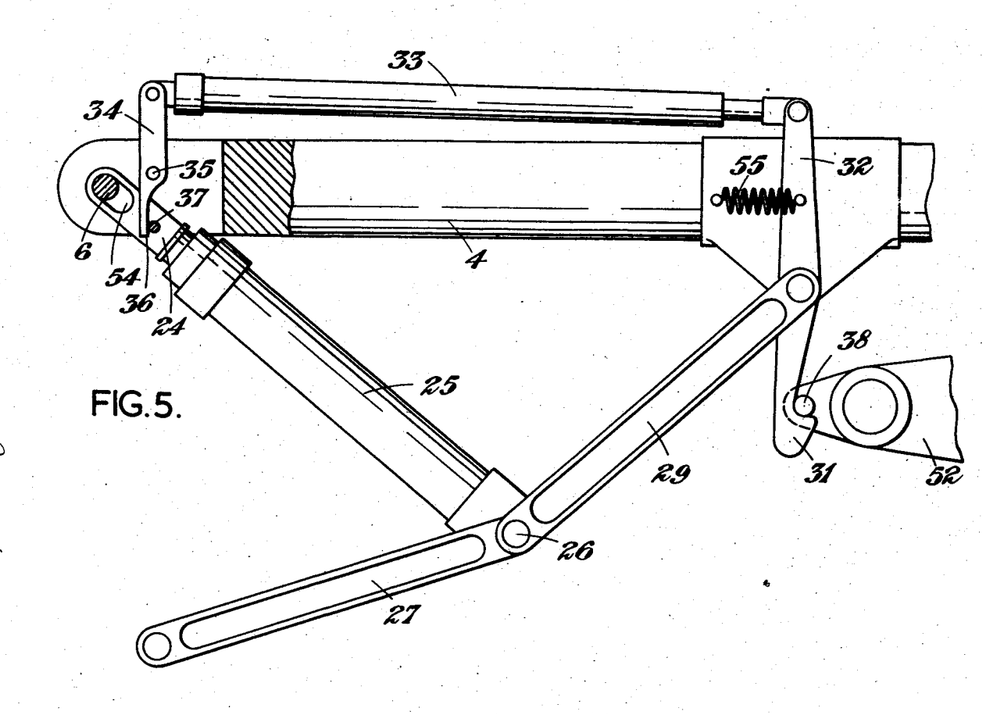

When the undercarriage has left the ground, the auxiliary shock absorber 56 is extended, due to the action of its air spring, thus lowering the rear wheels and lifting the front wheels in the direction of flight and pitching the beam 52 into the so-called free in air attitude indicated by the full line showing of the tyre in Figure 4. When the landing gear is nearing its retracted position (see Figure 1), the roller 61 will co-operate with the cam 63, the roller 61 and cam 63 positively guiding the beam further in relation to the undercarriage linkage structure. Further retraction movement will shift the undercarriage parts to allow roller 59 to engage the cam 62 and roll along the latter so as to guide positively the beam yet still further against the force of the spring in the cylinder of the telescopic unit 64, so that it is positively guided into nested relation with the undercarriage linkage to take up a position substantially parallel with the undercarriage leg structure 1 (see Figure 2). As shown in Figure 1a, the cam track 63 is constituted structurally by two spaced track portions both adapted to be engaged by the roller 61 during retraction with the parts positioned relatively as shown in Figure 1. The cam track 62 is structurally constituted by a single track parallel to the tracks 63 and positioned midway between them, longitudinally of the cam tracks. The arrangement is such that after the roller 59 engages the cam track 62 it may move along toward the right as viewed in Figure 1 to pass between the spaced cam track parts 63 and thus arrive at its final position corresponding to the retracted position of the linkage and undercarriage support 53 as shown in Figure 2. On this final retraction movement, the pin 38 will push away latch 31 against the force of the spring 55 and when pin 38 passes the latch, the said latch will return, due to the force of its spring, and hold the pin 38 in its recess to provide an uplock. Upon completion of the retracting movement, the support 52 and the undercarriage linkage are in nested relation, and the force exerted by the resilient unit 64 maintains the roller 59 and cam of the positioning means firmly in engagement.

On lowering the landing gear, the jack 25 is extended and the first outward movement of the piston rod 24 will allow the slot 54 to slide on the pin 6; at the same time the pin 37 will turn the projection 36 of the lever 34 around its pivot 35, carrying link 33 and arm 32 with it, against the force of the spring 55, moving the latch 31 in a clockwise direction and releasing uplock pin 38. Further outward movement of the piston rod 24 will jack-knife the arms 27 and 29, pivoting the strut 4 around the pin 6 in a clockwise direction. During the lowering operation, the subsidiary jack 44 is closed, the pins 22 being held in the stops 23 of the aircraft in the lowered position by the latch 41 co-operating with pin 42 of the aircraft.

The rollers 61 and 59 will roll over the cams 63 and 62 in succession, allowing the articulated beam 52 to return to the required landing pitching position, due to the action of the shock absorber 56, closing this said device slightly due to the action of a spring. The roller members 61 and 59 are rollingly engageable with the cam members 63 and 62 for anti-friction purposes, but the essential movement between the members when engaged is essentially one of relative sliding.

Referring now to the alternative arrangement shown in Figures 6 to 9, the undercarriage linkage structure again includes an outer cylinder 1, a sliding tube 2 telescopically mounted therein, a shock absorber being contained in this telescopic assembly, the structure terminating in pins 22 adapted to co-operate, when the landing gear is lowered, with stops 23 fixed to the aircraft. The outer cylinder 1 carries a lug 3 to which is pivotally connected by pins 5 one end of a rigid bracing member 4, the other end of which is pivotally connected at 6 to the aircraft. Pivotally mounted on the rigid bracing member 4 (see Figure 9) is the cylinder of a retraction jack 65, the piston rod 66 of which is pivoted at 68 to a lug 67 fast with the outer cylinder 1.

The upper end of the cylinder 1 is connected by a yoke 69 to a guide 39 which is pivotally attached at 40 to the aircraft, the pivot point 40 again forming the pivotal point of attachment of the undercarriage for retraction. Mounted on each end of the yoke 69 are latch levers 41 adapted to engage pins 42 fast on the aircraft, so as to provide a downlock for the lowered position. This downlock is secured by a spring box arrangement 70 which is arranged to urge the downlock into the locked position, whilst the unlocking is obtained by means of fluid pressure through a subsidiary jack such as the jack 44 shown in Figures 1 to 4, the piston rod of which acts to push the lever 41 off the pin 42.

The yoke 69 is held against the stops 23 when the undercarriage is lowered, and the landing loads are transmitted through the yoke as explained in the specification of co-pending U.S. application Serial No. 157,243, now Patent No. 2,690,887. It will, of course, be appreciated that the same applies to the stops 23 shown in Figures 1 and 2.

Hinged at one end to a bracket 50, fast with the undercarriage leg, is a telescopic unit including the cylinder 56 of an additional auxiliary shock absorber adapted to pitch the beam 52 carrying the wheels in such a way that one set of wheels, the rear ones in the direction of flight, will touch ground before the others, and will be pre-rotated so as to reduce the drag load on the under carriage. When the aircraft is airborne, the piston 57 of the auxiliary shock absorber 56 will extend, due to the action of its spring, and when the beam 52 is parallel with the ground the auxiliary shock absorber 56 will be partly closed, its action being explained in U.S. Patent No. 2,670,160 and U.S. Patent No. 2,732,152. The cylinder 56 is mounted on a sleeve (not shown), the sleeve in turn being pivoted at 71 to the beam 52, the tilting of which during retraction moves the cylinder 56 towards the beam, whilst, on lowering, reverse movement takes place.

The beam 52 is pivoted at 72 to the lower end of the undercarriage linkage, so as to be capable of taking part in a pivotal movement with relation to the leg. Pivoted at one end to the lower end of the leg and at the other end to the beam assembly are links 73 providing brake torque compensation, as explained in U.S. Patent No. 2,533,607.

A first member of an undercarriage support positioning means is mounted on the support 52 for movement therewith and comprises a roller or cam follower 61 which is free to rotate on a pin 60 carried by the support. A second member of the positioning means comprises a cam or hook member 75 (omitted from Figure 7 in the interests of clarity) pivotally mounted on the arm 77 of the brace 4 forming a part of the undercarriage linkage, and being urged in a counterclockwise direction, as viewed in the drawings, by a resilient force transmitting unit or spring box 78, the member 75 being rocked into the path of movement of the support 52. The hook member 75 is provided with a recess or cam track 76 which is adapted to cooperate with the cam follower 61 to position the support 52 in nested relation with the undercarriage linkage in a manner to be described.

The jack 65 is extended when the undercarriage is lowered and, when it is desired to retract the undercarriage, the downlock jack (not shown) is operated to move the latches 41 in an anti-clockwise direction against the bias of the spring arrangement 70 so as to release the pins 42 and allow the flat faces of the pins 22 to be moved off the stops 23 when the jack 65 starts closing. When the aircraft has left the ground and therefore the undercarriage is no longer in contact therewith, the auxiliary shock absorber 56 is extended, due to the action of its air spring, lowering the rear wheels and lifting the front wheels in the direction of flight, and thus pitching the beam 52 accordingly. The said pitching of the beam 52, due to the extension of the auxiliary shock absorber 56, does not bring the rollers 61 into contact with the recess 76 of the hooks 75 but this contact commences during the first part of and continues throughout the remaining portion of the retraction movement. The force of the retraction jack 65 will also move the auxiliary shock absorber 56 in its sleeve, allowing the beam to tilt further in relation to the outer cylinder 1 against the force of the spring box 78. The closure of the jack 65 brings the outer cylinder 1 into a position substantially parallel with the rigid bracing strut 4 and the beam 52 will follow into this position, due to the guidance of the hooks 75 which will be jackknifed in relation to the member 4. Upon completion of the retracting movement, the support 52 and the undercarriage linkage are in nested relation, and the force exerted by the resilient unit 78 maintains the member 75 and the roller 61 firmly in engagement. It will be appreciated that the recesses 76 allow for a lost motion of the rollers 61 so that the rollers do not tend to move the hooks 75 from the retracted position, which is attained by limiting the movement of the hooks. No external uplock jack for the undercarriage need be provided, the undercarriage preferably being held in the retracted position by an internal lock in the jack 65.

Figure 6:
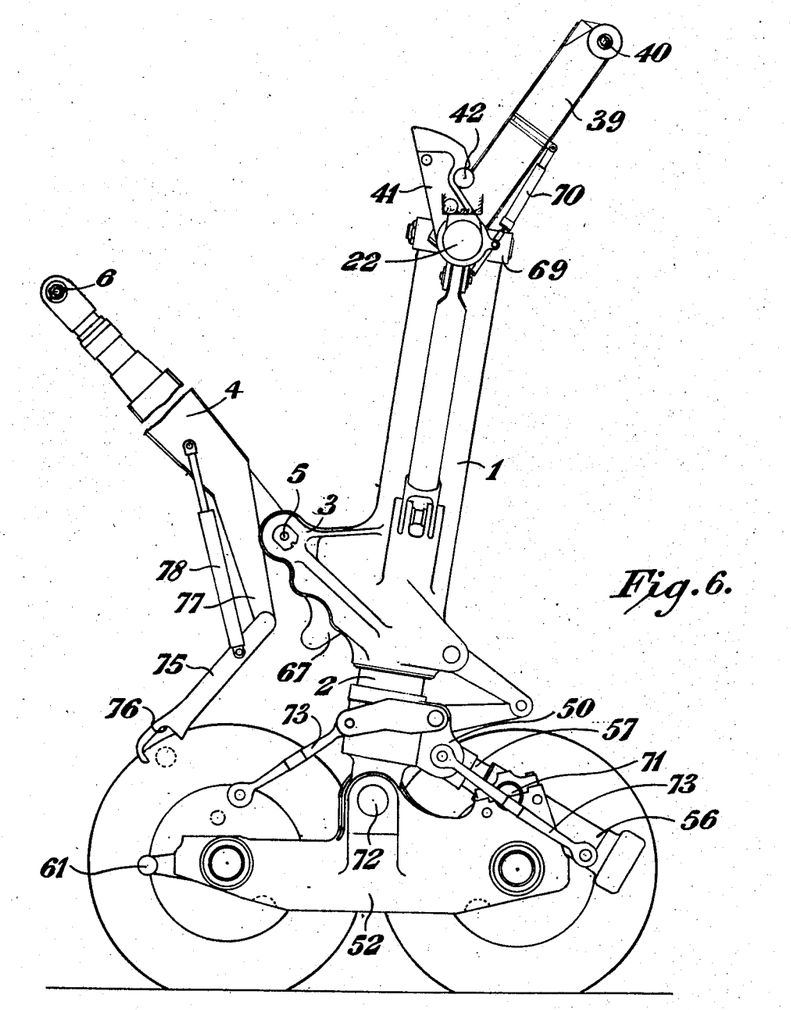
Figure 7:
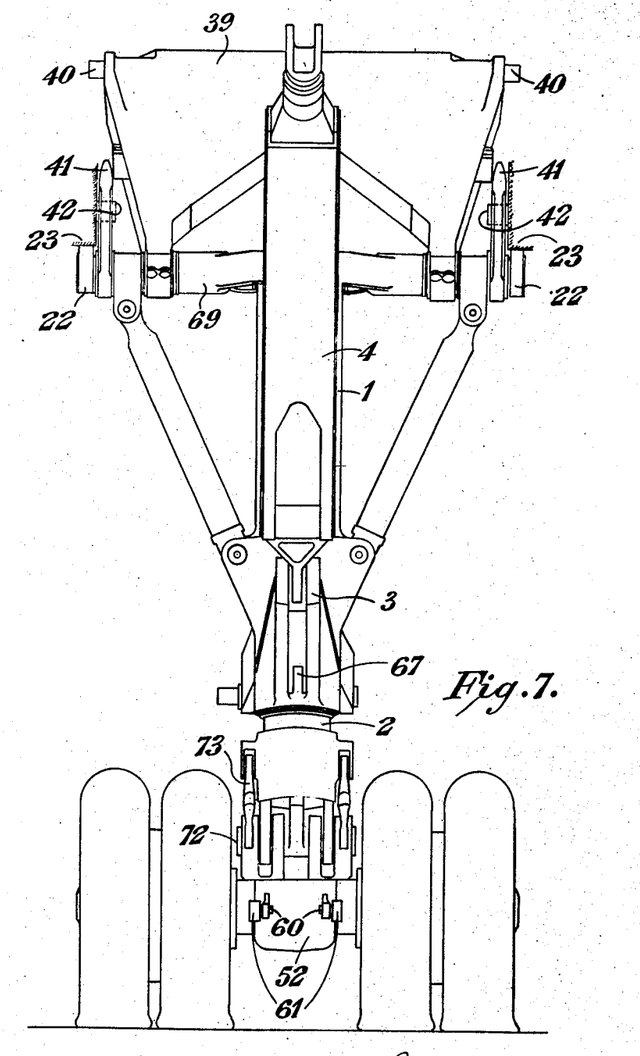
Figures 8A, 8B:
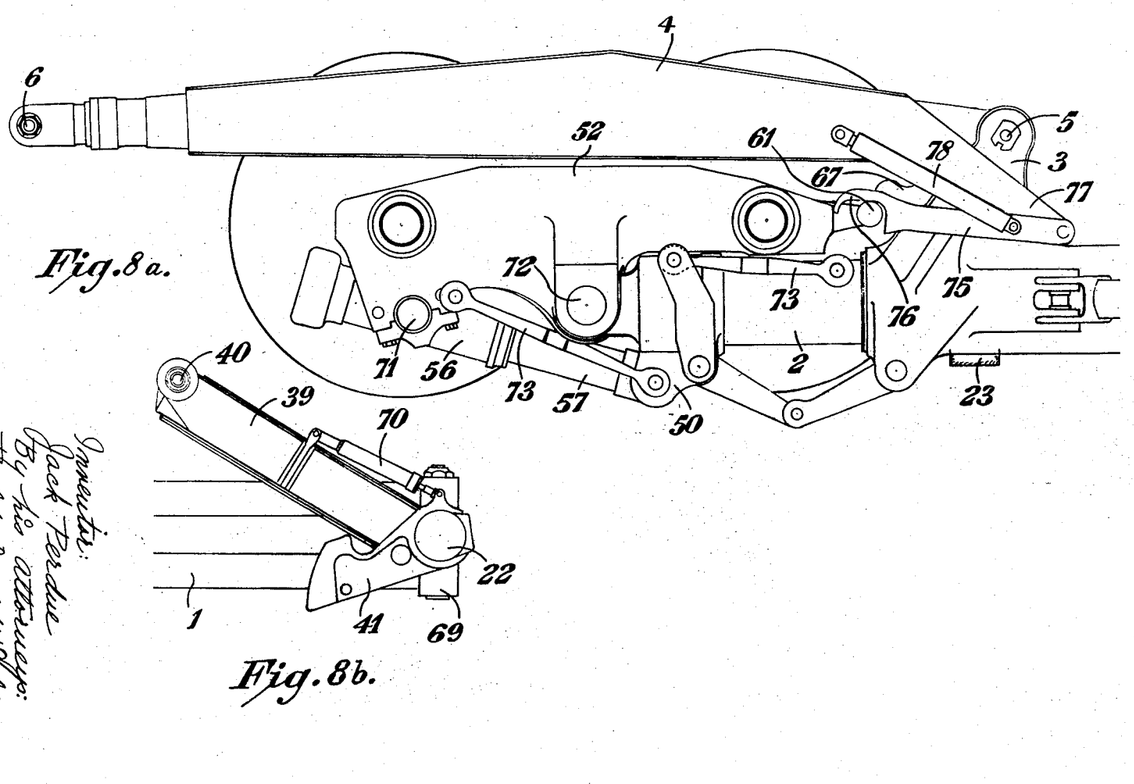
Figures 8a and 8b show the alternative mechanism in the fully retracted position with the undercarriage parts nesting in the aircraft frame, whilst
Figure 9:
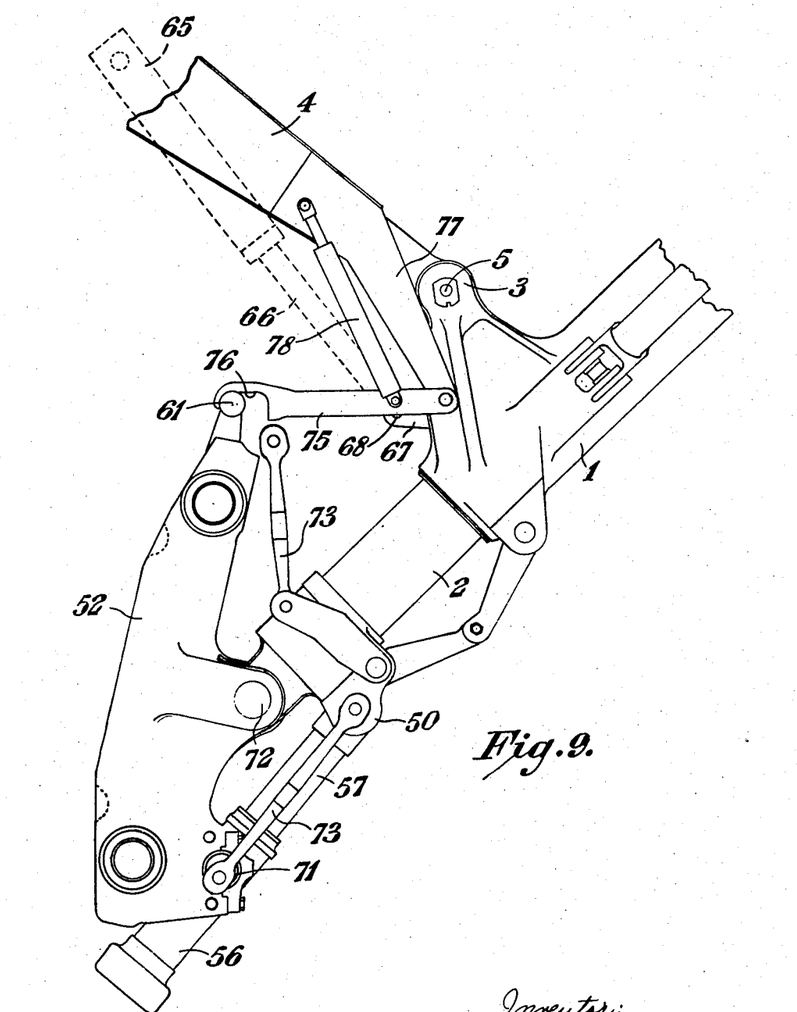
Figure 9 illustrates the parts in an intermediate position.

On lowering the undercarriage, the jack 65 is extended and the hooks 75 guide, through the rollers 61, the beam 52; the action of extending the jack 65, together with gravity, pushes the cylinder of the auxiliary shock absorber 57 back through the sleeve, so that the said shock absorber cylinder returns to the position in relation to the beam 52 as shown in Figure 6. At the end of the lowering the beam is moved into a position so that the rollers 61 are moved out of the recesses 76 in the hooks 75.

It can be seen that in these constructions an accurate and easily adjustable positioning of the beam 52 in relation to the undercarriage structure and the stowage place is obtained, without the necessity of providing a lock for this position.

This invention is described in conjunction with a construction wherein the sliding assembly of cylinders 1 and 2 contains the shock absorber. It could, however, be equally used for a construction wherein the shock absorber is outside this sliding assembly, for example, as illustrated in Figure 3 of U.S. Patent No. 2,732,152.

I claim:

1. In an aircraft construction having a frame, a linkage connected to said frame for movement relative thereto, and undercarriage support connected to said linkage for movement relative to said linkage, and means for effecting movement of said linkage and undercarriage support for moving said linkage and said undercarriage support from a normal lowered position to a retracted position in which said linkage and undercarriage support are nested together within said frame: the combination therewith of means for positioning said undercarriage support in nested relation with said linkage, said positioning means comprising first and second members disengaged from each other when said linkage and undercarriage support are in said normal lowered position; means mounting one of said members for movement with said undercarriage support; and means mounting the other of said members on said linkage in the path of movement of said one of said members in a position to be engaged by said one of said members prior to the end of the retracting movement of said linkage and said undercarriage support and to continue to be engaged by said one of said members during the final part of retracting movement of said linkage and undercarriage support, said members being relatively slidable when engaged, the continued engagement of said members during the final part of said retracting movement causing relative movement between said members and between said undercarriage support and said linkage during said last part of said retracting movement to position said undercarriage support and said linkage in nested relation upon completion of said retracting movement.

2. A construction as set forth in claim 1 in which one of said members comprises a cam track and the remaining one of said members comprises a cam follower.

3. A construction as set forth in claim 1 in which said one member comprises a cam follower and said other of said members comprises a cam track.

4. A construction as set forth in claim 1 in which said one member comprises a pair of cam followers and said other of said members comprises a pair of cam tracks, said followers of said pair being engageable with different tracks of said pair of tracks at different times during said retracting movement of said undercarriage.

5. A construction as set forth in claim 1 in which said one member comprises a cam follower and said other of said members comprises a hook element having a cam track engageable by said cam follower.

6. A construction as set forth in claim 1 including resilient force transmitting means interposed between and connected to said linkage and said undercarriage support for yieldably resisting relative movement of said linkage and said undercarriage support for urging said members into firm engagement during said part of said retracting movement and maintaining said members in firm engagement when said undercarriage support and said linkage are in nested relation.

7. A construction as set forth in claim 6 in which said resilient means is interconnected between said undercarriage support and a part of said linkage.

8. A construction as set forth in claim 6 in which said resilient means is interconnected between said other of said members and a part of said linkage.

References Cited in the file of this patent

UNITED STATES PATENTS

| | | |
|---|---|---|
| 2,345,021 | Waseige | Mar. 28, 1944 |
| 2,461,595 | Foster | Feb. 15, 1949 |
| 2,497,880 | Gassner | Feb. 21, 1950 |

FOREIGN PATENTS

| | | |
|---|---|---|
| 651,149 | Great Britain | Mar. 14, 1951 |
| 663,245 | Great Britain | Dec. 19, 1951 |
| 674,237 | Great Britain | June 18, 1952 |